W. T. HOWARD.

Broilers.

No. 5,240. Reissued Jan. 21, 1873.

Witnesses
Chas. E. Upperman
Jno. B. Haines

Inventor
William T. Howard
By his Attorney
T. W. Upperman

AM. PHOTO-LITHOGRAPHIC CO. N.Y. (OSBORNE'S PROCESS.)

UNITED STATES PATENT OFFICE.

WILLIAM T. HOWARD, OF BALTIMORE, MARYLAND, ASSIGNOR TO HENRY G. LEISENRING.

IMPROVEMENT IN BROILERS.

Specification forming part of Letters Patent No. 113,886, dated April 18, 1871; reissue No. 5,240, dated January 21, 1873.

*To all whom it may concern:*

Be it known that I, WILLIAM T. HOWARD, of the city of Baltimore and State of Maryland, have invented a new and Improved Broiler; and I do hereby declare the following to be a full, clear, and exact description of the same, reference being had to the accompanying drawing making a part of this specification, in which—

Figure 1:
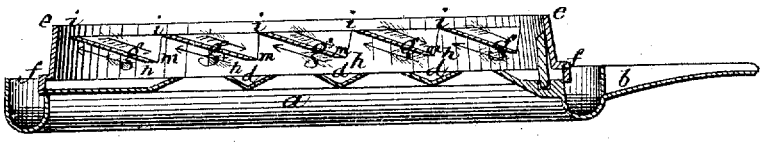
Figure 2:
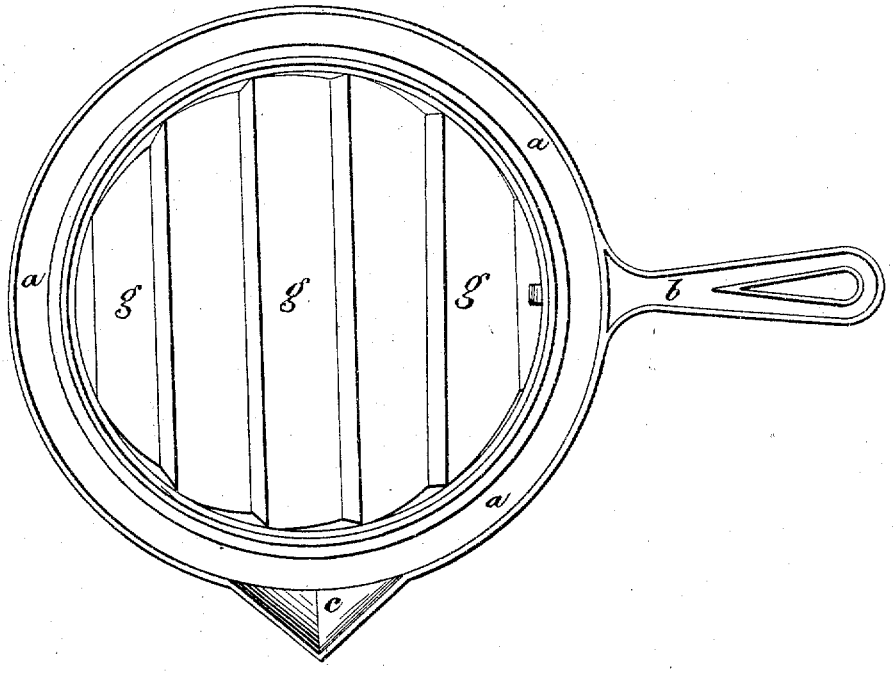

Figure 1 is a sectional elevation, and Fig. 2 a plan of a broiler embracing my improvements.

My invention relates to a broiler in which two sets of parallel horizontal bars are employed, one to support the meat and the other to conduct the juices which exude therefrom into a trough or other suitable receptacle, which also forms the base of the broiler.

Hitherto, so far as I am aware, no broiler has been provided with bars which, while arranged to conduct the grease or juices of the meat into grooved bars beneath them, have also admitted heated air and flame into direct contact with every part of the surface of the meat. Some portions of the bars would be interposed between the food being cooked and the fire or heat, and hence the best results have not been attained, since no skill or experience of the cook could avail to remedy the inevitable defect of allowing the heat or flame free access to one part of the meat, while the other was only subjected to the reflected heat of the bars on which it rested. By my invention I remedy this; and for this purpose I arrange the upper knife-edged meat-bars at a suitable angle of inclination, and in such relation to the parallel-grooved bars beneath as to conduct the exuded juices of the meat into them, while the escape of the smoke, gases, &c., is prevented, as will be hereinafter more fully set forth.

Referring to the drawing, *a* is an annular or other suitably-shaped vessel, having a handle, *b*, and a spout, *c*, and provided with transverse parallel bars *d*, grooved lengthwise of their upper sides, which grooves open at each end into the vessel *a*. *e* is the ring of the broiler proper, the same resting on the top of the inner side of the trough *a*, and provided with a flange, *f*, which passes down a little way into said vessel, and holds the broiler in place thereon. *g* are the parallel broiler-bars placed transversely of the ring *e*, and secured to the inside thereof at their ends in any suitable manner, said broiler-bars being so inclined that one edge of each is considerably higher than the other, the bars being sharpened at their upper edges, so as to present narrow or knife-edge surfaces, and on these only the meat rests, all the rest of its exterior being exposed directly to the action of heat. The lower edges of the bars *g* are immediately above the grooved bars *d*, so that all the fat and gravy that issues from the meat drops directly into the grooved bars, and runs thence into the trough *a*. There being a space, *h*, between each bar *d* and the bar *g* above it, the heat has two avenues of access past each bar *g* to the meat.

Such a construction and arrangement of parts, while it obviates the objections hereinbefore stated, also prevents the escape of gases, smoke, and offensive odors from the burning of the fat of the meat into the house, which is of a nature so disagreeable as to frequently cause the use of a broiler to be dispensed with.

A thorough practical test of this broiler has demonstrated that the smoke, gases, flame, &c., after passing up to the under surface of the knife-edged bars *g*, are deflected by them according to their angle of inclination, as shown by the arrows; leaving the said bars they ascend vertically upward at a point designated by the letter *i* in the drawing. Thus a vacuum is, as it were, created between the lower point *m* of one meat-bar and the course traversed by the smoke, gases, &c., under the contiguous one, which is, of course, above said point *m*. To fill this vacuum the smoke, gases, &c., are forced down by the pressure of the atmosphere between the articles of food being cooked into the space between the meat and gravy bars, where they are again heated and sent upward to be again forced down, and thus the operation is continued until the meat is cooked. If the draft of the stove is sufficiently effective the gases, instead of taking this continuous upward and downward course, may be carried off, after having once returned, through the chimney.

It may be mentioned as a result of the test given utensils of the construction hereinbefore described by persons in the trade that, holding the head but a short distance above the broiler while meat was being cooked, no odor was perceptible.

Having described my invention, I claim—

In a broiler, the broad knife-edged bars *g g*, inclined and arranged with relation to the parallel-grooved bars *d d* as herein shown and described, whereby the heat and flame are allowed free access to the entire surface of the meat, and the juices thereof conducted into the trough *a*, the whole constructed and combined so as to operate in the manner set forth.

WILLIAM T. HOWARD.

Witnesses:
GEO. H. HOWARD,
D. HAGERTY.